H. F. OBERGFELL.
BEARING.
APPLICATION FILED JAN. 10, 1913.

1,154,049.

Patented Sept. 21, 1915.

Witnesses
O. M. Wunnich
Hazel Ann Jones

Inventor
Herbert F. Obergfell
by Max W. Zabel
Atty.

UNITED STATES PATENT OFFICE.

HERBERT F. OBERGFELL, OF CHICAGO, ILLINOIS.

BEARING.

1,154,049.  Specification of Letters Patent.  Patented Sept. 21, 1915.

Original application filed June 8, 1912, Serial No. 702,553. Divided and this application filed January 10, 1913. Serial No. 741,165.

*To all whom it may concern:*

Be it known that I, HERBERT F. OBERGFELL, a citizen of the United States, residing at Chicago, in the county of Cook and State of Illinois, have invented a certain new and useful Improvement in Bearings, of which the following is a full, clear, concise, and exact description, reference being had to the accompanying drawings, forming a part of this specification.

My invention relates to bearings and has for its object the provision of an improved bearing for use more particularly in connection with shafting which enters a compartment in which it is desired to maintain a pressure or vacuum as the case may be, the bearing in its nature serving to prevent leakage from or toward said compartment. Such a bearing is of particular utility for instance in connection with internal combustion engines where fluid under pressure is confined within the compartment forming the crank chamber, and into which compartment the shaft must project. Under these conditions leakage away from this compartment is most undesirable, and the bearing of my improved design accomplishes this purpose.

My invention herein was originally disclosed in my application Serial No. 702,553, filed June 8, 1912, of which said co-pending application this present application is a division.

I will describe one form which my invention may take by referring to the accompanying drawing, in which—

Figure 1:
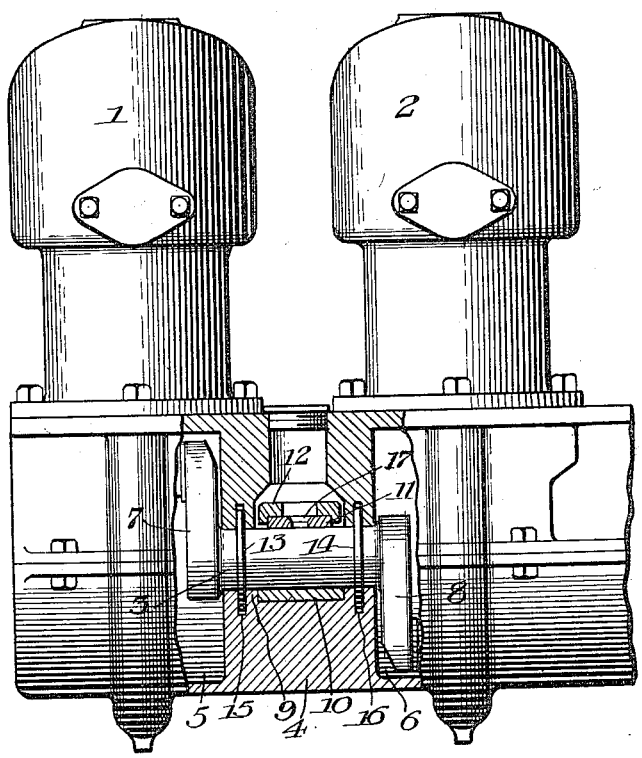
Figure 2:
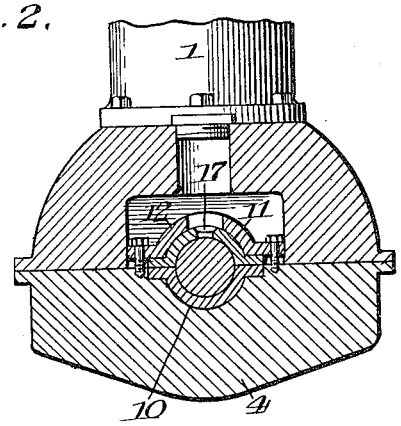

Figure 1 is a longitudinal sectional view of an internal combustion engine equipped with my invention, and Fig. 2 is a detail view of the bearing portion in transverse section.

Referring more particularly to the drawing, I have an engine here shown as a two cylinder engine having the cylinders 1 and 2 which are adapted to transmit power to a shaft 3. A bed plate 4 is provided which has on either side crank chambers 5 and 6, which crank chambers are inclosed so as to permit of compression of gas therein. The shaft is of course united to suitable cranks 7 and 8. My invention contemplates the provision of a bearing for this shaft 3 having means whereby leakage of gas to or from either crank case may be avoided. The bed plate 4 is suitably apertured to accommodate the shaft having a circular longitudinal bore 9 for this purpose, and a portion of this bed plate has a bearing portion 10 upon which the shaft 3 rests. The upper portion of the bearing portion of the shaft consists of the bearing portion 11 suitably held in place by the clamping plate 12. In order to prevent leakage of fluid past the shaft I provide flanges 13 and 14 which are secured to the shaft 3, which flanges enter recesses 15 and 16 provided in the bed plate 4. The flanges 13 and 14 are circular and extend around the periphery of the shaft 3. The recesses 15 and 16 into which these flanges enter are slightly longer than the flanges, as shown, but snugly fit the sides of these flanges. By reason of the flanges 13 and 14 forming a snug sliding fit within the recesses 15 and 16 all leakage of gas is prevented at least to an objectionable degree. It will be seen that the pressure of the fluid in the crank case does not flow around the shaft, thereby detracting from the lubrication; and at the same time the pressure within the crank case is maintained as desired. A suitable orifice 17 is provided to permit of lubrication.

From what has been described the general nature of my invention will be apparent, as it will also be apparent that the construction may take many and various forms without departing from the spirit of my invention.

Having however thus described one form which the invention may take, what I claim as new and desire to secure by Letters Patent is:

Means for preventing leakage longitudinally of a shaft consisting of a shaft, a bearing, two annularly enlarged washer-shaped portions upon said shaft, a bearing portion forming part of said bearing between said enlarged portions, and recesses in said bearing for said enlarged portions having a diameter larger than the said annular portion, said annular bearing portions having a sliding fit with the opposite sides of their associated recess to thereby prevent the leakage aforesaid.

In witness whereof, I hereunto subscribe my name this 19th day of December, A. D., 1912.

HERBERT F. OBERGFELL.

Witnesses:
O. M. WERMICH,
H. A. JONES.

Copies of this patent may be obtained for five cents each, by addressing the "Commissioner of Patents, Washington, D. C."